United States Patent [19]
Miyahara

[11] Patent Number: 5,136,435
[45] Date of Patent: Aug. 4, 1992

[54] SCREEN-SPLITTING SYSTEM FOR A VIDEO RECORDING AND REPRODUCING APPARATUS

[75] Inventor: Keisuke Miyahara, Tokorozawa, Japan

[73] Assignee: TEAC Corporation, Tokyo, Japan

[21] Appl. No.: 409,131

[22] Filed: Sep. 19, 1989

[30] Foreign Application Priority Data

Sep. 27, 1988 [JP] Japan .................. 63-241849

[51] Int. Cl.$^5$ .................. H04N 9/80; H04N 5/78; G11B 27/02
[52] U.S. Cl. .................. 360/14.1; 360/57; 360/9.1; 358/319; 358/183
[58] Field of Search .................. 360/14.1, 9.1, 57, 59; 358/183, 185, 170, 319

[56] References Cited

U.S. PATENT DOCUMENTS

| | | | |
|---|---|---|---|
| 4,423,440 | 12/1983 | Tachi | 358/335 |
| 4,829,388 | 5/1989 | Nakayama et al. | 360/35.1 |
| 4,849,832 | 7/1989 | Yamagata et al. | 360/57 |
| 4,852,074 | 7/1989 | Tanaka et al. | 358/328 |
| 4,890,168 | 12/1989 | Inoue et al. | 358/335 |

FOREIGN PATENT DOCUMENTS

59-113580 6/1984 Japan .

*Primary Examiner*—Aristotelis Psitos
*Assistant Examiner*—Varsha V. Sheladia
*Attorney, Agent, or Firm*—Woodcock Washburn Kurtz Mackiewicz & Norris

[57] ABSTRACT

A video tape recorder having provisions for erasing a desired fraction of each frame of a composite picture signal on a magnetic tape and for recording substitute picture information on the erased fractions, thereby making it possible to split the screen into two windows for the simultaneous display of different images. Included is a window size input device to be operated upon by the user for specifying a desired fraction of each frame of the composite picture signal recorded on the tape. A frame fraction signal generator circuit responds to the output from the window size input device, as well as to horizontal and vertical sync pulses derived from the composite picture signal being reconstructed from the tape, for generating a frame fraction signal indicative in real time of the specified fraction of each frame of the composite picture signal to be erased from the tape. A mode-setting circuit responds to the frame fraction signal for connecting an erase oscillator to a pair of video transducers thereby causing erasure of the specified fraction of each frame of the composite picture signal on the tape. The mode-setting circuit also responds to the frame fraction signal for permitting substitute picture information to be recorded at the erased fractions of the prerecorded picture signal on the tape.

11 Claims, 7 Drawing Sheets

SCREEN-SPLITTING SYSTEM FOR A VIDEO RECORDING AND REPRODUCING APPARATUS

BACKGROUND OF THE INVENTION

My invention relates to a video recording and reproducing apparatus such as that commonly known as the video tape recorder or deck for use with a magnetic tape cassette. More specifically, my invention pertains to means in such an apparatus whereby the screen of the associated display can be split into two windows or sections for the simultaneous presentation of different images.

Video tape recorders for use with magnetic tape cassettes have won commercial acceptance on a large scale. They record picture information in the form of a succession of frames of a composite picture signal on the tape cassette. The composite picture signal is a combination of the picture signal with horizontal and vertical synchronizing (sync) pulses and other information needed for reproduction and visual presentation of the picture signal.

It has been known to replace desired part of each frame of the prerecorded composite picture signal with some other picture information, so that the resulting presentation on a display is split into two windows or regions showing different images. The usual conventional practice for this split-screen presentation of different images has been to combine the outputs from two separate video tape recorders, or from one video tape recorder and one video camera, by use of very complex equipment. The composite picture signal resulting from the combination of the outputs from the two sources has then been recorded by an additional video tape recorder.

I object to this conventional practice as it involves the use of two or three video tape recorders, possibly plus a video camera or the like, and of the equipment for combining the outputs from two separate sources. Furthermore, since different devices are used for providing the video outputs to be combined and for recording the combined signals, such defects have been practically unavoidable as jitter and deteriorations in signal-to-noise ratio and frequency characteristic.

Japanese Unexamined Patent Publication No. 59-113580, laid open to public inspection on Jun. 30, 1984, represents a known attempt to solve the problem. It suggests a video tape recorder having provisions for accepting substitute picture information from some other source and for recording it at part of each frame of the prerecorded composite picture signal on the tape. However, this prior application is silent on the subject of how to accurately erase desired parts of the signal on the tape and how to record substitute picture information on exact erased parts of the tape.

SUMMARY OF THE INVENTION

I have hereby invented a self-contained apparatus capable of accurately erasing a specified fraction of each frame of a composite picture signal prerecorded on a record medium, and of recording substitute picture information at the exact erased fractions, by simple means that are built into the apparatus without any major alteration of the existing parts.

Briefly, my invention concerns an apparatus for recording and reproducing successive frames of a composite picture signal on a record medium such as a magnetic video tape cassette, with the composite picture signal being comprised of picture information and horizontal and vertical sync pulses. My invention is directed more specifically to the combination, in such an apparatus, comprising transducer means for reading, writing and erasing the composite picture signal on the record medium, a playback circuit connected to the transducer means for reconstructing the composite picture signal read from the record medium, and a sync pulse separator circuit connected to the playback circuit for deriving the horizontal and vertical sync pulses from the composite picture signal reconstructed.

Also included is a window size input means to be operated upon by the user for specifying a desired fraction of each frame of the composite picture signal recorded on the record medium. A frame fraction signal generator circuit is connected to both the sync pulse separator circuit and the window size input means. The frame fraction signal generator circuit responds to the horizontal and vertical sync pulses derived from the composite picture signal for generating, in synchronism with the composite picture signal being reconstructed, a frame fraction signal indicative of the specified fraction of each frame of the composite picture signal which is to be erased from the record medium. The frame fraction signal cannot per se be used for signal erasure, so that an erase signal generator circuit is provided which can be connected as required to the transducer means for supplying thereto an erase signal for erasing the composite picture signal on the record medium as dictated by the frame fraction signal.

The combination of my invention further comprises mode-setting means connected to the frame fraction signal generator circuit for connecting the erase signal generator circuit to the transducer means when the frame fraction signal indicates the specified fraction of each frame of the composite picture signal to be erased and hence for causing the transducer means to erase the specified fraction of each frame of the composite picture signal on the record medium. The mode-setting means connects the transducer means to the playback circuit when the frame fraction signal does not indicate the specified fraction of each frame of the composite picture signal.

My invention also features provisions for recording desired substitute picture information at the erased fraction of each frame of the prerecorded composite picture signal on the record medium. Such provisions include a record circuit for receiving and processing a composite picture signal to be recorded. During operation in a substitute record mode, the mode-setting means connects the record circuit to the transducer means when the frame fraction signal indicates the specified fraction of each frame of the composite picture signal which has been erased, so that desired substitute picture information can be recorded exactly at the erased fraction of each frame of the composite picture signal on the record medium.

Preferably, the frame fraction signal takes the form of pulses having their durations so determined that the horizontal sync pulses contained in the specified fraction of each frame of the composite picture signal on the record medium are left unerased. Jitter will be minimized in this manner.

The partly erased composite picture signal must be reproduced for recording substitute picture information at the erased parts. Since the erased parts would generate white noise, I recommend that a black level oscillator be provided for the elimination of the white noise. The playback circuit may be switched from playback amplifier means to the black level oscillator when the frame fraction signal indicates the erased fractions of the prerecorded composite picture signal.

The above and other features and advantages of my invention and the manner of realizing them will become more apparent, and the invention itself will best be understood, from a study of the following description and appended claims, with reference had to the attached drawings showing some preferable embodiments of my invention.

DESCRIPTION OF THE PREFERRED EMBODIMENTS

Figure 1:
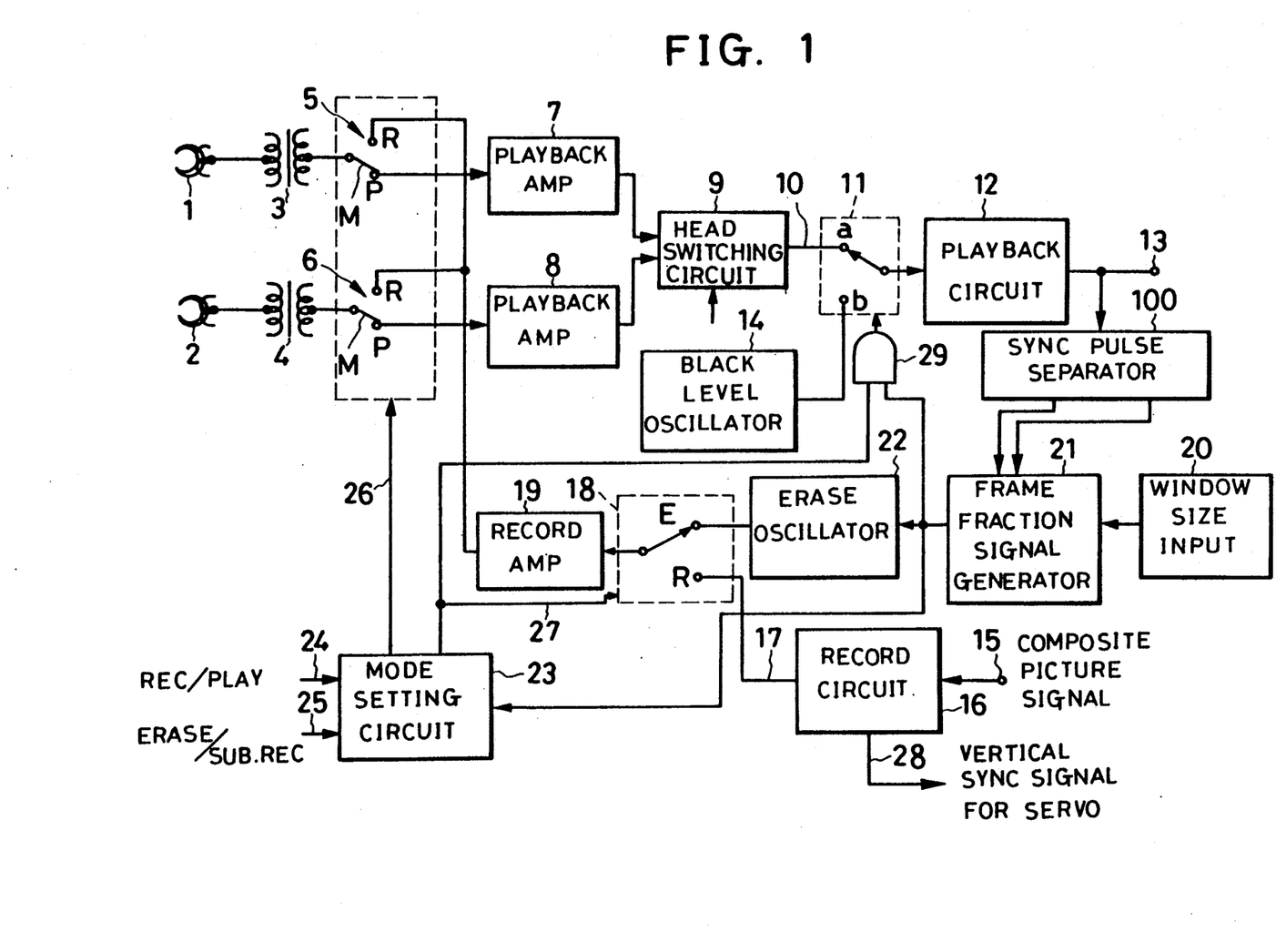
FIG. 1 is a block diagram of a preferred form of video tape recorder including a dual window system in accordance with my invention.
Figure 2:
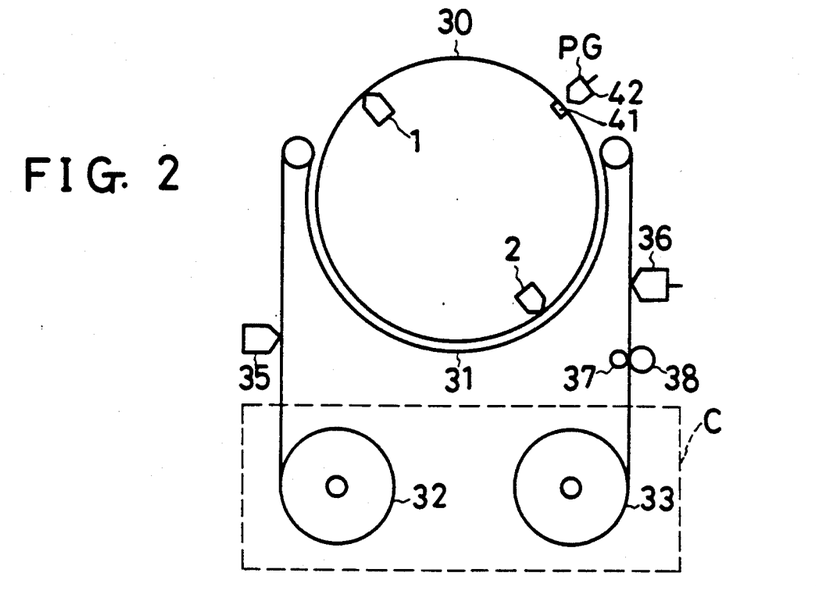
FIG. 2 is a schematic illustration of the path of the magnetic tape past a rotary head assembly in the apparatus of FIG. 1.

Typically, the video tape recorder including the screen-splitting system of my invention may be configured as diagrammatically illustrated in FIG. 1. The representative video tape recorder has a pair of video transducers or heads 1 and 2 mounted to a rotary drum 30 as shown in FIG. 2 to make up the familiar rotary head assembly for the recording and playback of picture information on a magnetic tape 31 of a video tape cassette C. The transducers 1 and 2 are connected to rotary transformers 3 and 4 and thence to record/playback select switches 5 and 6, respectively. These switches take the form of electronic (analog) switches in practice. In FIG. 1, however, I have shown the switches 5 and 6 as each comprising a movable contact M and two fixed contacts R and P for the ease of understanding. Thus, in each switch, movable contact M engages the fixed contact R for recording, and the other fixed contact P for playback.

The playback contacts P of the record/playback select switches 5 and 6 are connected to playback amplifiers 7 and 8, respectively, and thence to a head switching circuit 9. The output line 10 of the head switching circuit 9 is connected via an electronic analog switch 11 to a playback-signal-processing circuit 12 (hereinafter referred to as the playback circuit). Comprising a frequency demodulator and other known circuit means which are not shown because of their familiar nature, the playback circuit 12 produces a composite picture signal, based for example on the NTSC principle, for delivery to the next processing stage, not shown, via a video output terminal 13.

The switch 11 has a first fixed contact a connected to the head switching circuit 9, and a second fixed contact b connected to an oscillator 14. Either of these fixed contacts a and b may be selectively connected to the playback circuit 12. The oscillator 14 generates a signal having a frequency corresponding to the pedestal or black level of the composite picture signal, so that I will refer to this oscillator as the black level oscillator hereafter.

At 15 is shown an input terminal for receiving a composite picture signal including picture information to be recorded. The video input terminal 15 is connected to a record-signal-processing circuit 16 (hereinafter referred to as the record circuit) of known construction comprising a frequency modulator, etc. The record circuit 16 has its output line 17 connected to a record amplifier 19 via the record contact R of an electronic record/erase select switch 18. The record amplifier 19 has its output connected to the record contacts R of both record/playback select switches 5 and 6.

Seen at 20 is a window size input device to be operated upon by the user to specify a desired size (height) of a window to be opened. When actuated, the window size input device 20 puts out a window size signal in terms of the number of the horizontal scanning pulses that is determined by the desired window height, as will be later explained in more detail.

The window size input device 20 has its output connected to a frame fraction signal generator circuit 21. Also connected to this frame fraction signal generator circuit 21 is a sync pulse separator circuit 100 which has its input connected to the output of the playback circuit 12 for deriving the vertical and horizontal sync pulses from the composite picture signal reproduced. The frame fraction signal generator circuit 21 responds to both the window size signal and the derived vertical and horizontal sync pulses for generating a frame fraction signal indicative of a desired fraction of each frame of the composite picture signal which, when the apparatus is in operation in the erase mode, must be erased from the magnetic tape to open a window of the size that has been specified by the window size input device 20.

The frame fraction signal takes the form of pulses of relatively short durations in this particular embodiment. When the apparatus is in the erase mode, these pulses are used to determine those parts of the composite picture signal on the record medium which are to be erased preparatory to the recoding of substitute picture information on the erased parts. I will therefore refer to the output pulses of the frame fraction signal generator circuit 21 as the erase pulses during the description of the erase mode operation of the apparatus. The frame fraction signal generator circuit 21 will be detailed later with reference to FIG. 4.

The frame fraction generator circuit 21 is connected to an erase oscillator 22, which in turn is connected to the noted record amplifier 19 via the erase contact E of the record/erase select switch 18. In response to the erase pulses fed from the frame fraction signal generator circuit 21, the erase oscillator 22 produces an erase signal having a frequency required for erasing the desired parts of the recorded information during the durations of the erase pulses.

A mode setting circuit 23 functions to establish the record mode or playback mode in response to a record/playback setting signal fed over a line 24, and the erase mode or substitute record mode in response to an erase/substitute-record mode setting signal fed over a line 25. For the establishment of any such desired mode the mode setting circuit 23 is connected to the record/playback select switches 5 and 6 via an output line 26 and to the record/erase select switch 18 via another output line 27. The frame fraction signal generator circuit 21 is connected to both the mode setting circuit 23 and the switch 11 for switching from one mode to another in synchronism with its output pulses.

This video tape recorder is constructed for operation in synchronism with the composite picture signal fed to the input terminal 15 from its external source. The record circuit 16 has a vertical sync signal line 28 connected to the servo control system, not shown, of the tape transport and the rotary head assembly set forth hereafter.

FIG. 2 shows the path of travel of the magnetic tape 31 of the video tape cassette C mounted in position within the apparatus. The magnetic tape 31 has its opposite ends anchored to a pair of reels or hubs 32 and 33 rotatably mounted within the housing of the tape cassette C. Pulled out from the cassette housing, the magnetic tape 31 is shown loaded against a rotary head assembly comprising the rotary drum 30 with the pair of video transducers 1 and 2 mounted in diametrically opposite positions thereon.

Disposed along the path of travel of the magnetic tape 31 from reel 32 to reel 33 are a full-width erase head 35, the rotary drum 30 with the video transducers 1 and 2 thereon, a control head 36, and a capstan 37 and pinch roller 38. FIG. 2 also shows a permanent magnet 41 mounted to the rotary drum 30, and an associated transducer position sensor 42 for ascertaining the angular positions of the video transducers 1 and 2 on the rotary drum 30. The control head 36 and the transducer position sensor 42 constitute parts of a servo system that is conventional in video tape recorders in general. As has been mentioned, the tape speed control servo system is capable of external synchronization.

Figure 3:
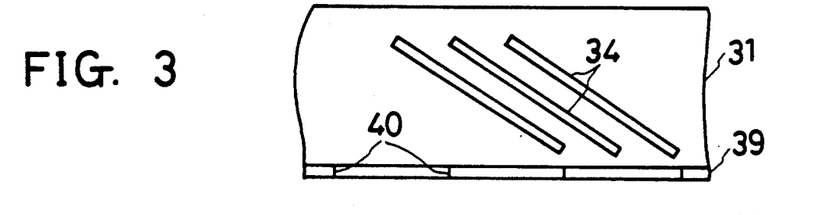
FIG. 3 is a fragmentary plan view of the magnetic tape, showing in particular a series of slanting record tracks and a longitudinal control track on the tape.

FIG. 3 is an illustration of the magnetic tape 31. Since the magnetic tape 31 travels past the revolving drum 30 at an angle to a plane perpendicular to the axis of the drum, a series of discrete slanting record tracks are formed as at 34 on the tape. Also, the magnetic tape 31 has a continuous control track 39 formed along one of its opposite longitudinal edges. Control data 40 is to be recorded on, and reproduced from, the control track 39 by the control head 36 of FIG. 2.

Figure 4:
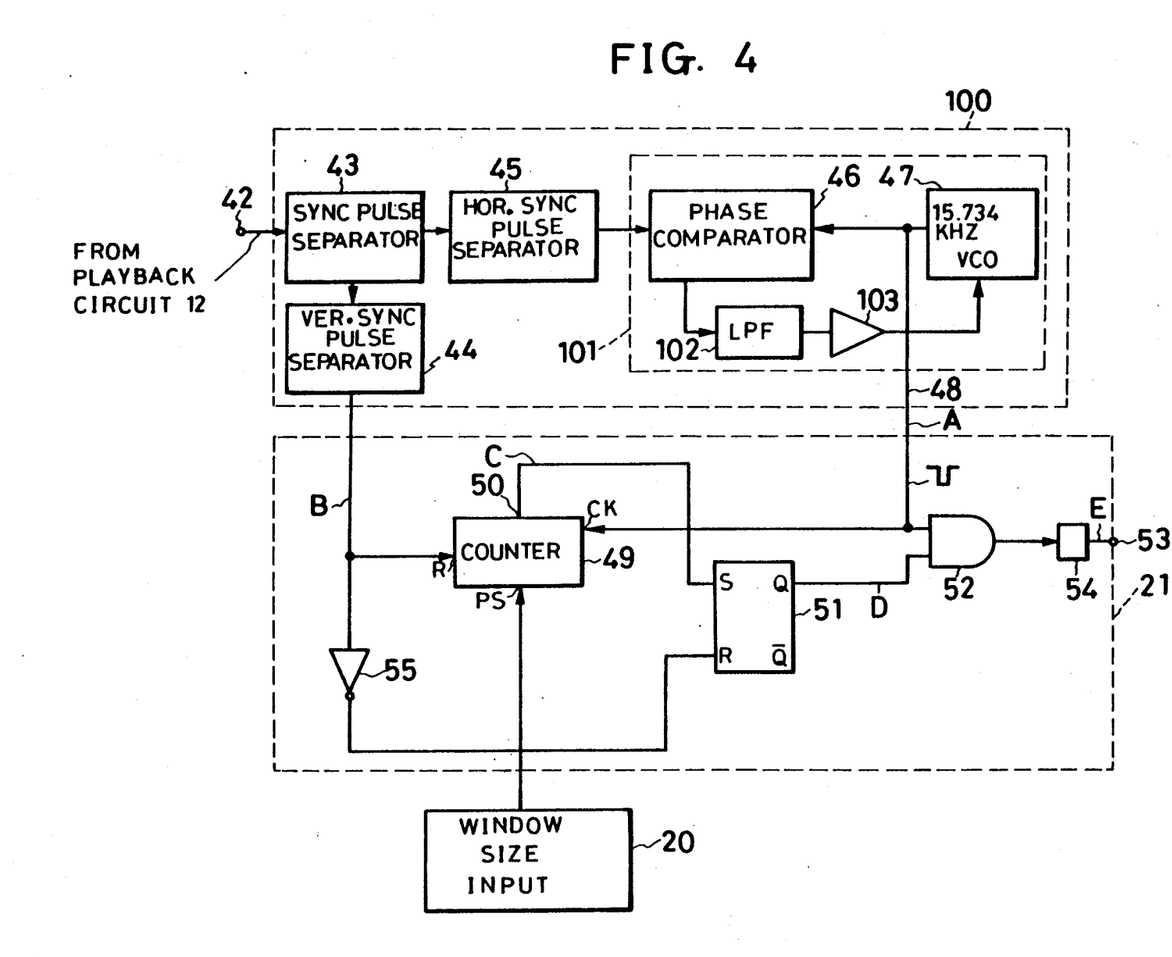
FIG. 4 is a block diagram showing in greater detail the sync pulse separator circuit and the frame fraction signal generator circuit in the apparatus of FIG. 1.

Reference is directed to FIG. 4 for a closer study of the frame fraction signal generator circuit 21 and the sync pulse separator circuit 100. The construction and operation of these circuits 21 and 100 will be better understood by referring also to FIG. 5, which show at (A) through (E) the waveforms of the signals appearing in the various parts of the circuits 21 and 100. In FIG. 4, therefore, I have indicated by the capitals A through E the parts where the correspondingly designated waveforms of FIG. 5 appear.

The sync pulse separator circuit 100 has a terminal 42 for inputting the composite picture signal that has been reconstructed by the playback circuit 12 of FIG. 1. The input terminal 42 is connected to a horizontal and vertical sync pulse separator circuit 43 which separates both horizontal and vertical sync pulses from the composite picture signal by taking advantage of their difference in amplitude from the picture data. The circuit 43 is connected to both a vertical sync pulse separator circuit 44 and a horizontal sync pulse separator circuit 45. These separator circuits 44 and 45 derives the vertical and horizontal sync pulses, respectively, from their inputs by taking advantage of the difference in frequency therebetween. Despite the showing of FIG. 4, however, the three separator circuits 43, 44 and 45 could be of unitary construction.

The vertical sync pulse separator circuit 44 has its output coupled directly to the frame fraction signal generator circuit 21. The vertical sync pulses thus fed from the sync pulse separator circuit 100 to the frame fraction signal generator circuit 21 are seen at (B) in FIG. 5.

Figure 5:
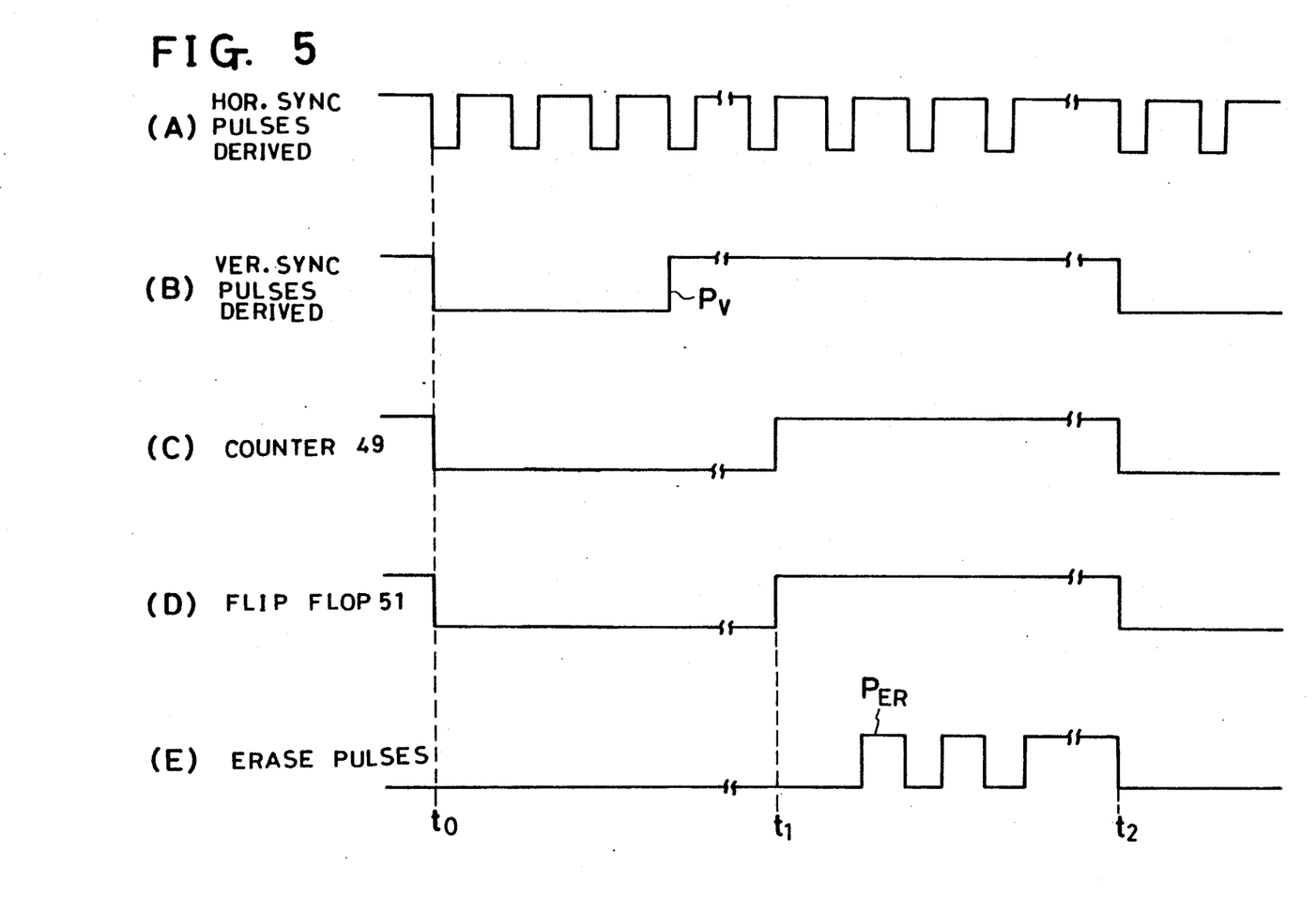
FIG. 5, consisting of (A) through (E), is a diagram of waveforms appearing in the various parts of the FIG. 4 circuitry.

The horizontal sync pulse separator circuit 45, on the other hand, has its output connected to a phase lock loop (PLL) circuit 101, instead of being connected directly to the frame fraction signal generator circuit 21. The PLL circuit 101 is comprised of a phase comparator circuit 46, a 15.734-kHz voltage-controlled oscillator (VCO) 47, a low-pass filter (LPF) 102 and an amplifier 103. Thus the PLL circuit 101 puts out a series of horizontal sync pulses at a constant phase angle relative to the incoming horizontal sync pulses which have been derived from the reproduced composite picture signal. FIG. 5 shows at (A) the horizontal sync pulses thus produced by the sync pulse separator circuit 100. These horizontal sync pulses are fed over a line 48 to the frame fraction signal generator circuit 21.

The frame fraction signal generator circuit 21 includes a binary counter 49 having a clock input CK connected to the horizontal synch pulse input line 48, a reset input R connected to the vertical sync pulse separator circuit 44, an eight-bit present input PS connected to the window size input device 20, and an output 50.

I understand that, in this embodiment of my invention, a window of various size is to be opened under a desired horizontal scanning line. Thus the window size input device 20 includes a switch circuit for generating, as the window size signal, an eight-bit binary digital signal representative of the number of horizontal scanning lines from a reference position corresponding to a vertical sync pulse of the NTSC composite picture signal, to the desired horizontal scanning line at which the blanking of the screen is to be commenced.

The output 50 of the counter 49 is connected to a set terminal S of an RS flip flop 51 via a trigger circuit, not shown, for delivering the signal of FIG. 5(C) to the flip flop. The unshown trigger circuit may either form a discrete unit or may be built into the counter 49 or the flip flop 51. The reset input R of the flip flop 51 is connected to the vertical sync pulse separator circuit 44 via a NOT circuit 55 and a trigger circuit, not shown.

Also included in the frame fraction signal generator circuit 21 is an AND gate 52 for inhibiting the erasure of the horizontal sync pulses contained in the composite picture signal on the magnetic tape and for permitting the erasure of only the picture information. The AND gate 52 has one input connected to the horizontal sync pulse output line 48 of the sync pulse separator circuit 100 for receiving the horizontal sync pulses of FIG. 5(A), and another input to the Q output of the flip flop 51 for receiving the signal of FIG. 5(D). The output of the AND gate 52 is connected to the output terminal 53 of the pulse generator circuit 21 via a pulse duration reduction circuit 54. This circuit 54 serves the purpose of preventing the complete erasure of the front and back porches, including the color bursts, neighboring the horizontal sync pulses of the composite picture signal, as will become better understood from the subsequent description of operation. The output terminal 53 produces the erase pulses or frame fraction signal of FIG. 5(E).

OPERATION

Let us suppose that a window is to be opened at the bottom half of the screen, with the consequent need for the erasure of the corresponding fraction of each frame of picture information on the magnetic tape 31. In that case the window size input device 20 may be operated upon to input the number of horizontal scanning lines from that determined by each vertical sync pulse to the first horizontal scanning line of the bottom half of the screen.

Also, a signal indicative of an erase mode (e.g. signal in the state of binary "1") may be fed into the mode setting circuit 23, FIG. 1, over the line 25. The mode setting circuit 23 will respond to the input erase mode signal, as well as to the erase pulses from the frame fraction signal generator circuit 21, by causing the movable contacts M of the record/playback select switches 5 and 6 to engage the playback contacts P in the absence of the erase pulses. Furthermore, the mode setting circuit 23 will cause the movable contact of the switch 11 to engage the playback contact a, and the movable contact of the record/erase select switch 18 to engage the erase contact E.

Figure 6:
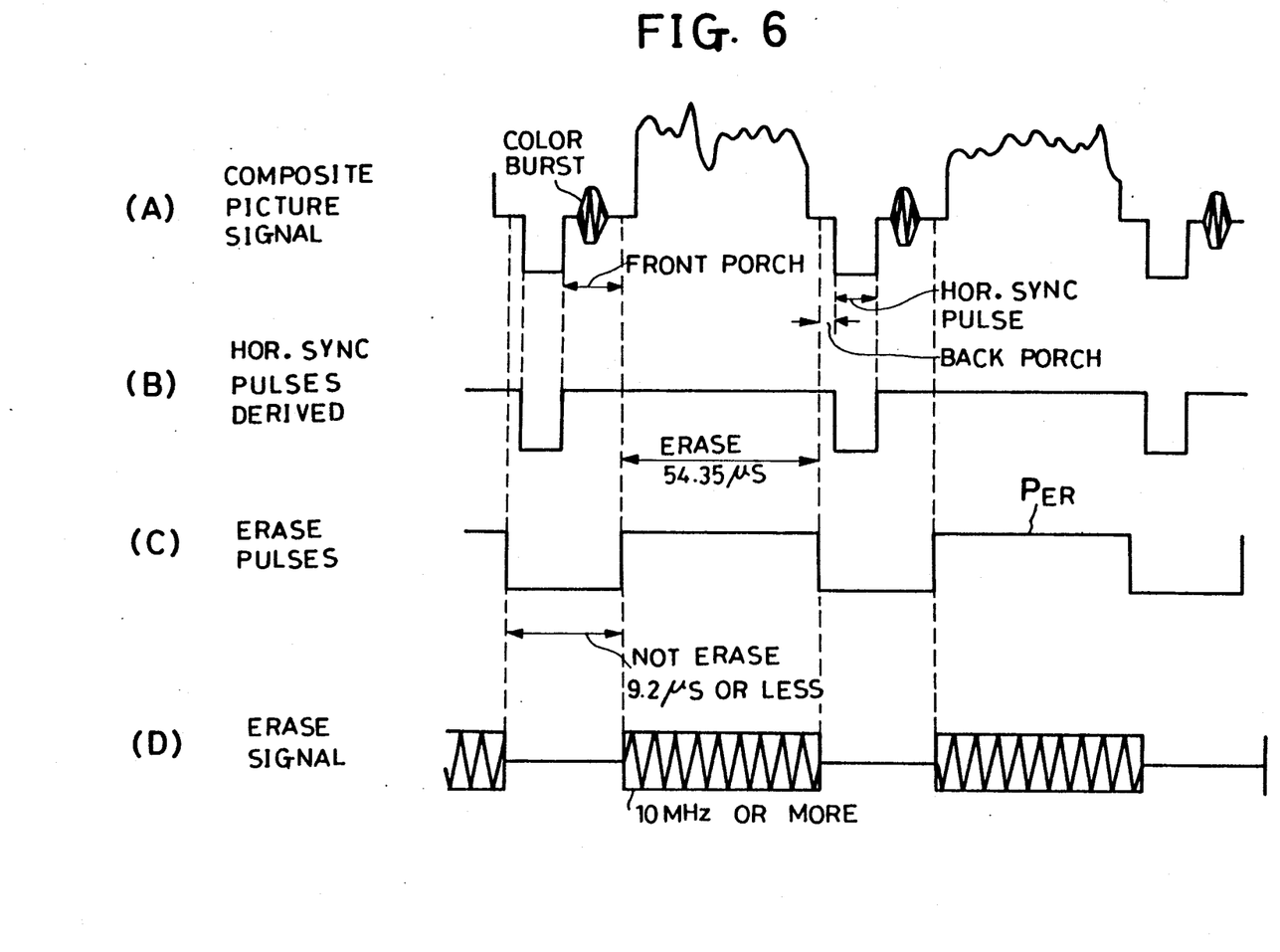
FIG. 6, consisting of (A) through (D), is a diagram of waveforms useful in explaining how desired fractions of the composite picture signal are erased by the FIG. 1 system.

With the FIG. 1 circuitry conditioned as above for the erase mode, the playback circuit 100 will input the amplified outputs from the video transducers 1 and 2 and reconstruct and put out the composite picture signal shown at (A) in FIG. 6. Receiving this composite picture signal, the sync pulse separator circuit 100 will derive therefrom the horizontal sync pulses of FIG. 5(A) and the vertical sync pulses of FIG. 5(B). It may be pointed out at this juncture that the horizontal sync pulses produced by the sync pulse separator circuit 100 appear during the durations of the vertical sync pulses and of the equalizing pulses, too. Also, the vertical sync pulses produced by the sync pulse separator circuit 100 are each equivalent in duration to six vertical sync pulses contained in the composite picture signal.

As indicated at FIG. 5(C), the counter 49, FIG. 4, of the frame fraction signal generator circuit 21 will be reset by the leading edge, at time $t_0$, of each incoming vertical sync pulse $P_v$. The flip flop 51 of the frame fraction signal generator circuit 21 will be likewise reset as at FIG. 5(D). So reset, the counter 49 will be incremented by the horizontal sync pulses of FIG. 5(A) being fed to its clock input CK from the sync pulse separator circuit 100.

Suppose that the counter 49 has counted, at time $t_1$ in FIG. 5, the horizontal sync pulses up to the number that has been preset at the window size input device 20. The output 50 of the counter 49 will then go high as at FIG. 5(C), thereby resetting the flip flop 51. Consequently, the Q output of the flip flop 51 will also go high at the time $t_1$ as at FIG. 5(D).

This high output from the flip flop 51 indicates the desired fraction of each frame of the composite picture signal to be erased from the magnetic tape 31. However, since the horizontal sync pulses and neighboring parts of the composite picture signal must be left unerased, the flip flop output of FIG. 5(D) is directed into the AND gate 52 together with the horizontal sync pulses of FIG. 5(A) that have been derived from the reproduced composite picture signal by the sync pulse separator circuit 100. The output from the AND gate 52 is low during the low states of the horizontal sync pulses even when the flip flop output is high. The resulting output pulses of the AND gate 52 are slightly reduced in duration by the pulse duration reduction circuit 54. FIG. 5(E) represents the erase pulses (frame fraction signal) $P_{ER}$ thus obtained at the output terminal 53 of the frame fraction signal generator circuit 21.

The erase pulses $P_{ER}$ are shown also at FIG. 6(C). The duration of each erase pulse is 54.35 microseconds whereas the time spacing between the erase pulses is not more than 9.20 microseconds. A comparison of (A) and (C) in FIG. 6 will reveal that not only the horizontal sync pulses, but also parts of the front and back porches, of the composite video signal are to be left unerased. The unerased parts of the front porches include the color bursts.

Figure 7:
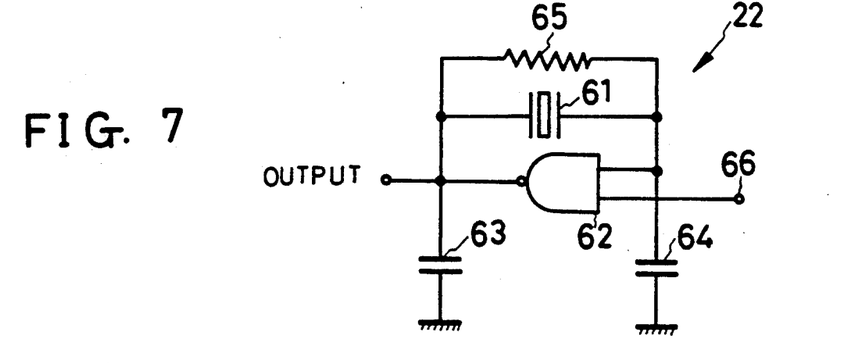
FIG. 7 is a schematic diagram showing in more detail the erase oscillator of the FIG. 1 system.

In response to the incoming erase pulses the erase oscillator 22 will generate an erase signal with a frequency of 10 MHz or more, as schematically illustrated at FIG. 6(D). A preferred form of the erase oscillator 22 is shown in detail in FIG. 7. It comprises a crystal oscillator element 61, a NAND gate 62, two capacitors 63 and 64, and a resistor 65. It will therefore be seen that the erase oscillator 22 generates the erase signal only during the duration of each erase pulse supplied to its input terminal 66.

The frame fraction signal generator circuit 21 will also deliver its output pulses to the mode setting circuit 23, causing the latter to condition the record/playback switches 5 and 6 for the record mode. Accordingly, the erase signal from the erase oscillator 22 will be supplied to the pair of video transducers 1 and 2 via the record/erase select switch 18, record amplifier 19, record/playback select switches 5 and 6, and rotary transformers 3 and 4. The erase signal will erase the required parts of the composite picture signal on the magnetic tape 31, to an extent predetermined by the number of horizontal scanning lines that has been input at the window size input device 20.

The counter 49 and flip flop 51 of the frame fraction signal generator circuit 21 will be both reset at time $t_2$, as shown at (C) and (D) in FIG. 5, when one field (in the case of interlaced scanning) of the composite picture signal comes to an end and the next vertical sync pulse appears as at (B) in the same figure. The control information 40, FIG. 3, on the control track 39 of the tape 31 is left unerased. The above described process of partial erasure of the picture information on the magnetic tape is applicable regardless of where the picture is static (still mode) or dynamic (normal mode).

The magnetic tape must be rewound for recording any desired substitute picture data on its erased parts, although of course no such rewinding will be necessary if the apparatus is in the still mode. Also, a signal indicative of the substitute recording mode (e.g. signal in the state of binary "0") may be applied to the mode setting circuit 23, FIG. 1, over the line 25. The mode setting circuit 23 will respond by conditioning the record-/playback select switches 5 and 6 for the playback mode, and the record/erase select switch 18 for the record mode.

The mode setting circuit 23 will also apply a high input to the AND gate 29 in response to the substitute recording signal. Consequently, the movable contact of the switch 11 will engage the fixed contact b, permitting the black level oscillator 14 to deliver its output to the playback circuit 12, only when the frame fraction signal generator circuit 21 is generating the pulses of FIG. 5(E). The black level oscillator 14 can be of the same construction as the erase oscillator 22 shown in detail in FIG. 7. Should the black level signal be not applied to the playback circuit 12, white noise would be generated from the erased parts of the composite picture signal, possibly making it difficult to derive the horizontal sync pulses.

The composite picture signal including the substitute information to be recorded may now be supplied to the record circuit 16 via the input terminal 15 from any such suitable source as a video camera, another video tape recorder, or a frame memory. The record circuit 16 will derive from the composite picture signal the vertical sync pulses for servo control purposes, for delivery over the line 28. Since the present apparatus is constructed for external synchronization as aforesaid, the known servo system will function to control the rotary drum 30, with the pair of video transducers 1 and 2 thereon, and the magnetic tape 31 for synchronizing the vertical sync pulses on the tape with those on the line 28.

With the tape travel synchronized as above, the successive tracks 34 on the tape 31 are scanned with the video transducers 1 and 2. Of course, in the still mode, the same track may be scanned repeatedly. Also, the same window size signal as in the erase mode set forth previously may be input to the frame fraction signal generator circuit 21. This circuit 21 will then generate the frame fraction signal in the form of the pulses $P_{ER}$ of FIGS. 5(E) and 6(C) as in the erase mode. The mode setting circuit 23 will respond to these pulses by actuating the record/playback select switches 5 and 6 into the record mode. That part of the substitute composite picture signal which corresponds to the time interval $t_1-t_2$ in FIG. 5 will then be recorded on the tape 31. The substitute picture information will be recorded on those parts of the tape from which the original picture information has been erased. The sync and control data on the tape are not rewritten. The writing of the substitute information on the erased parts of the tape prevents the intermingling of the original and new colors due to residual magnetism.

ALTERNATE EMBODIMENT

Figure 8:
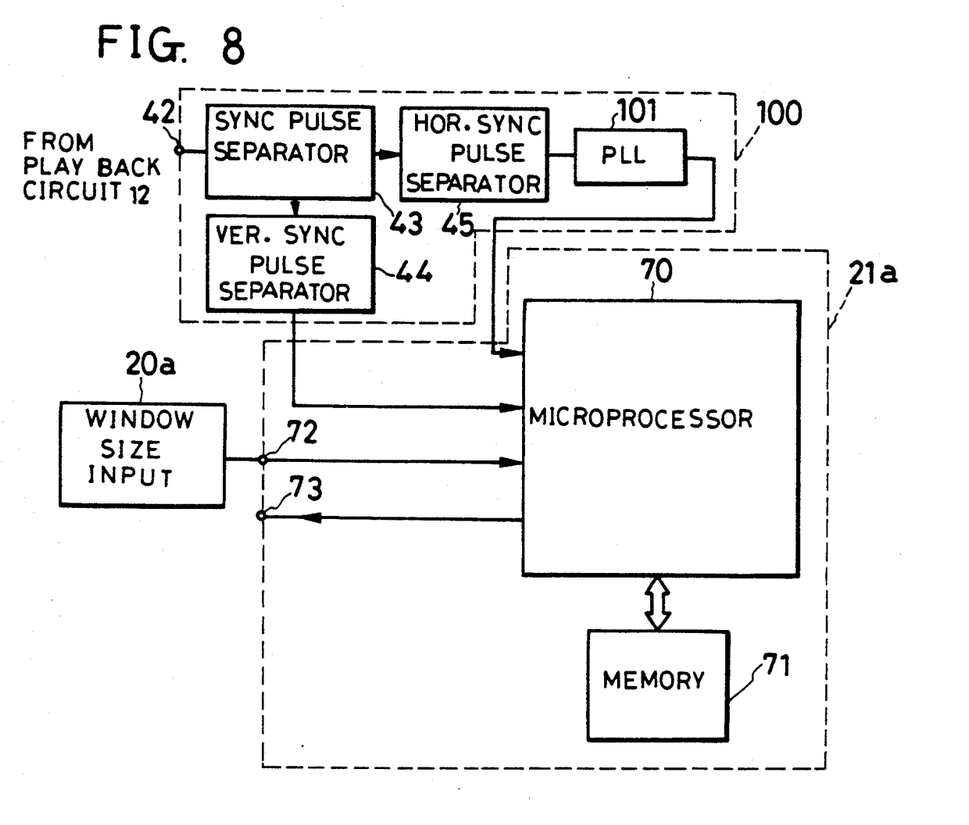
FIG. 8 is a block diagram of an alternative form of frame fraction signal generator circuit, shown together with the sync pulse separator circuit and a correspondingly modified window size input device.

The frame fraction signal generator circuit 21, as well as the associated window size input device 20, of the foregoing embodiment may be modified as shown at 20a and 21a in FIG. 8 in order to open a window of any desired shape or size anywhere on the screen. The modified frame fraction signal generator circuit 21a comprises a microprocessor 70 and a memory 71 for generating the frame fraction signal in response to data supplied from the modified window size input device 20a.

The microprocessor 70 is also connected to the sync pulse separator circuit 100, which can be of the same construction as in the preceding embodiment, for inputting the vertical and horizontal sync pulses that have been derived from the composite picture signal being read out from the tape.

Figure 9:
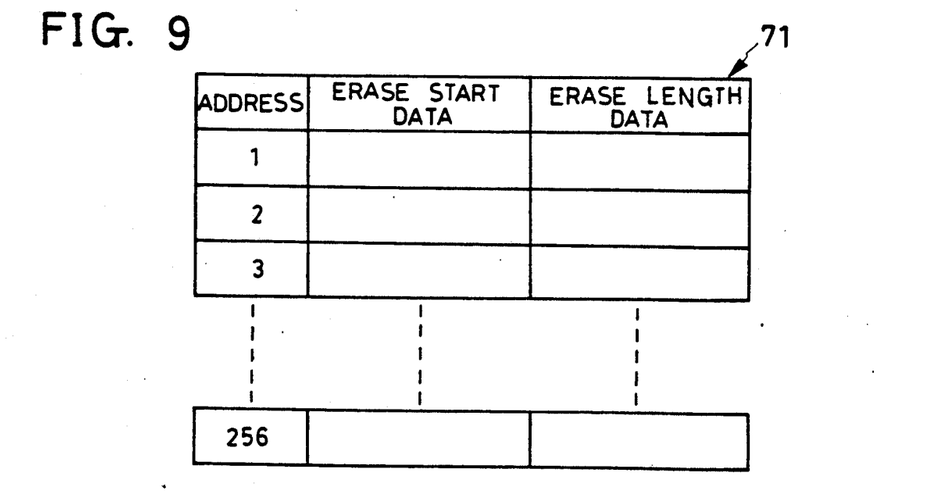
FIG. 9 is a table explanatory of the functions of a memory included in the alternative frame fraction signal generator circuit of FIG. 8.

As illustrated in FIG. 9, the memory 71 of the frame fraction signal generator circuit 21a has Addresses 1–256 corresponding respectively to the horizontal scanning lines of each field. Each address is intended for the storage of data representative of a desired position on the corresponding horizontal scanning line where the blanking of the screen is to be started for opening a window, and of a the length of a desired part of the horizontal scanning line which is to be blanked. All such data can be input through the alternate window size input device 20a comprising a touch screen 104 of FIG. 10, which is electrically coupled to the data input terminal 72, FIG. 8, of the modified frame fraction signal generator system 21a, as explained more specifically in the following.

Figure 10:
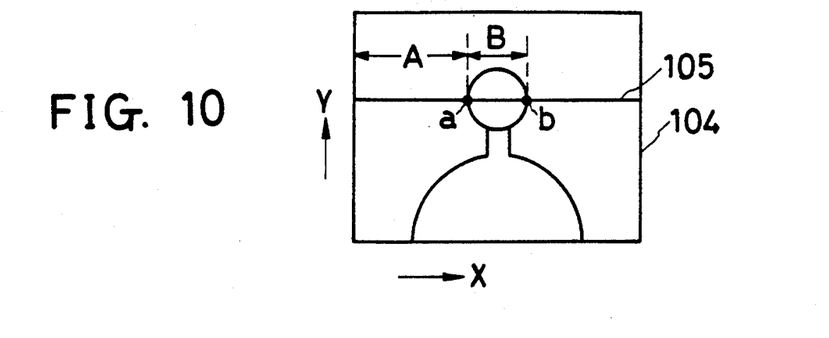
FIG. 10 is an illustration of a touch screen employed as the modified window size input device for use with the alternative frame fraction signal generator circuit of FIG. 8.

Take for example a horizontal scanning line indicated at 105 in FIG. 10. Let us also assume that a blanking of the picture is to be commenced at point a, and terminated at point b, on the line 105. All that is needed to specify the two points a and b on the line 105 is the data representative of the distance or time A from the left hand end, as seen in FIG. 10, of the line 105 to the point a, and of the distance or time B from point a to point b. The distance or time data A and B are to be stored via the microprocessor 70 in that address of the memory 71 which corresponds to the particular horizontal scanning line 105.

If the number of horizontal scanning lines is 256, the touch screen 104 may be thought of as resolving itself into as many elemental parts in the y direction indicated in FIG. 10. In the x direction, on the other hand, the screen may be resolved into approximately 500 elemental parts. The microprocessor 70 may be so constructed and programmed that, as the user draws the outline of a desired window to be opened on the touch screen, the required distance or time data A and B may be stored in the required addresses of the memory 71. Alternatively, such required data may be input through a keyboard.

Figure 11:
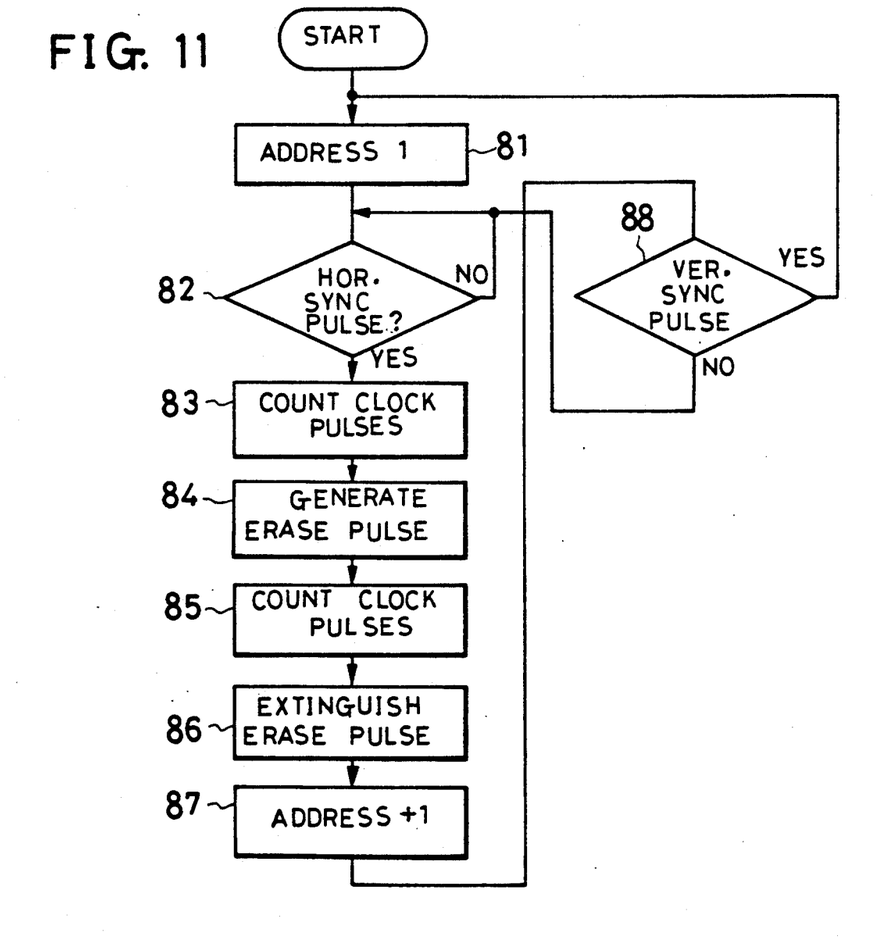
FIG. 11 is a flow chart explanatory of the program introduced into the alternative frame fraction signal generator circuit of FIG. 8.

FIG. 11 is a flow chart explanatory of an example of program that may be introduced into the microprocessor 70 of the frame fraction signal generator circuit 21a in order to cause the same to generate the erase pulses used in the erase mode of operation of the FIG. 1 circuitry. First, at Step 81, the microprocessor 70 reads the data that has been stored in Address 1 of the memory 71. Then, upon receipt of a horizontal sync pulse from the sync pulse separator circuit 100 at Step 82, the microprocessor starts at Step 83 the counting of clock pulses up to a number corresponding to the desired blanking start position on the corresponding horizontal scanning line. Then, upon counting the required number of clock pulses, the microprocessor starts production of an erase pulse at the output terminal 73, FIG. 8, of the frame fraction signal generator circuit 21a at Step 84.

Concurrently with the beginning of production of the erase pulse, the microprocessor restarts at Step 85 the counting of clock pulses up to a number corresponding to the desired blanking length and, at Step 86, extinguishes the erase pulse at that count.

Then the microprocessor proceeds to Step 87, reading the data in the next address of the memory 71. Then, at Step 88, the microprocessor waits for the arrival of a vertical sync pulse that has been derived from the reconstructed composite picture signal. The microprocessor returns to Step 82 in the absence of a vertical sync pulse and similarly creates another erase pulse for the next horizontal scanning line of the same field. When supplied with a vertical sync pulse from the separator circuit 100, the microprocessor proceeds as required to the production of erase pulses for the next field or frame.

POSSIBLE MODIFICATIONS

Although I have shown and described my invention in terms of preferable embodiments thereof, I do not wish my invention to be limited by the exact details of such disclosure. The following is a brief list of possible modifications or alterations of the illustrated embodiments which I believe all fall within the scope of my invention:

1. A counter, different from the counter 49, could be connected to the reset input R of the flip flop 51 in the frame fraction signal generator circuit 21 of FIG. 4. Reset by each vertical sync pulse from the sync pulse separator circuit 100 and clocked by the horizontal sync pulses from the same circuit, the additional counter might be used for resetting the flip flop 51 upon counting the horizontal sync pulses to a desired moment later than the time $t_1$ in FIG. 5. It becomes possible in this manner to open a window not only at a bottom part, but also at any desired intermediate part, of the screen.
2. The erase oscillator 22 in FIG. 1 could be maintained in constant oscillation only if a switch were provided on its output line. The switch might be actuated by the pulse generator circuit 21, permitting the erase oscillator to deliver the erase signal to the transducers 1 and 2 only when required.
3. Two amplifiers could be provided for separately amplifying the erase signal and the composite picture signal to be recorded, instead of making common use of the amplifier 19 for both purposes.

What I claim is:

1. An apparatus for recording and reproducing successive frames of a composite picture signal on a record medium, the composite picture signal being comprised of picture information and horizontal and vertical sync pulses, in combination the apparatus comprising:
    (a) transducer means for reading, writing and erasing the composite picture signal on the record medium;
    (b) a playback circuit connected to the transducer means for reconstructing the composite picture signal read from the record medium;
    (c) a sync pulse separator circuit connected to the playback circuit for deriving the horizontal and vertical sync pulses from the composite picture signal reconstructed;
    (d) window size input means for specifying a desired fraction of each frame of the composite picture signal recorded on the record medium;
    (e) a frame fraction signal generator circuit having first circuit means and second circuit means, the first circuit means being connected to both the sync pulse separator circuit and the window size input means and being responsive to the horizontal and vertical sync pulses derived from the composite picture signal for generating a pulse having a duration indicative of the desired fraction of each frame of the composite picture signal on the record medium, the second circuit means being connected to both the first circuit means and the sync pulse separator circuit for modifying the output pulses of the first circuit means with the horizontal sync pulses derived from the composite picture signal for providing, as the frame fraction signal, a series of pulses out of phase with the derived horizontal sync pulses, so that the horizontal sync pulses contained in the desired fraction of each frame of the composite picture signal on the record medium are left unerased;
    (f) an erase signal generator circuit capable of connection to the transducer means for supplying thereto an erase signal for erasing the composite picture signal on the record medium; and
    (g) mode-setting means connected to the frame fraction signal generator circuit for connecting the erase signal generator circuit to the transducer means when the frame fraction signal indicates the fraction of each frame of the composite picture signal to be erased and hence for causing the transducer means to erase the desired fraction of each frame of the composite picture signal on the record medium, the mode-setting means connecting the transducer means to the playback circuit when the frame fraction signal does not indicate the desired fraction of each frame of the composite picture signal.

2. The apparatus of claim 1, further comprising a record circuit for receiving and processing a composite picture signal to be recorded, the mode-setting means being capable, when the apparatus is in operation in a substitute record mode, of connecting the record circuit to the transducer means when the frame fraction signal indicates the desired fraction of each frame of the composite picture signal which has been erased, the transducer means recording the desired substitute picture information at the erased fraction of each frame of the composite picture signal on the record medium.

3. The apparatus of claim 2, further comprising:
    (a) a black level signal generator for generating a black level signal representative of the black level of the composite picture signal on the record medium; and
    (b) switch means for normally holding the playback circuit connected to the transducer means and for connecting the playback circuit to the black level signal generator only when the frame fraction signal indicates the desired fraction of each frame of the composite picture signal.

4. The apparatus of claim 1, wherein the window size input means delivers to the frame fraction signal generator circuit a digital window size signal indicative of a desired fraction of each frame of the composite picture signal to be erased from the record medium, and wherein the first circuit means of the frame fraction signal generator circuit comprises:
    (a) a counter having a reset input connected to the sync pulse separator circuit for inputting the vertical sync pulses derived from the composite picture, a preset input connected to the window size input means for inputting the digital window size signal, a clock input connected to the sync pulse separator circuit for inputting the horizontal sync pulses derived from the composite picture signal, and an output for generating an output signal upon agreement of the count of the horizontal sync pulses with the digital window size signal; and (b) a flip flop having a set input connected to the output of the counter, and a reset input connected to the sync pulse separator circuit for inputting the vertical sync pulses derived from the composite picture signal.

5. The apparatus of claim 4, wherein the second circuit means of the frame fraction signal generator circuit comprises a logic circuit having a first input connected to the flip flop of the first circuit means, and a second input connected to the sync pulse separator circuit for inputting the horizontal sync pulses derived from the composite picture signal.

6. The apparatus of claim 5, wherein the second circuit means of the frame fraction signal generator circuit further comprises means for reducing the duration of each output pulse of the logic circuit.

7. The apparatus of claim 1 wherein the sync pulse separator circuit comprises:
 (a) first circuit means for deriving the vertical sync pulses from the composite picture signal;
 (b) second circuit means for deriving the horizontal sync pulses from the composite picture signal; and
 (c) a phase lock loop circuit connected to the second circuit means for stabilizing the phase angle of the derived horizontal sync pulses preparatory to delivery to the frame fraction signal generator circuit.

8. The apparatus of claim 1, wherein the window size input means permits a desired fraction of each frame of the composite picture signal to be specified in terms of any two desired points on any of the horizontal scanning lines of a field, and wherein the frame fraction signal generator circuit comprises:
 (a) a memory having a set of addresses corresponding respectively to all the horizontal scanning lines of one field, each address being for the storage of data representative of the spacing between one extremity of the associated horizontal scanning line and one desired point thereon, and of the spacing between the two desired points thereon; and
 (b) a microprocessor connected between the window size input means and the memory for storing the required data in the required addresses of the memory as such data is supplied from the window size input means, the microprocessor being also connected to the sync pulse separator circuit for generating the frame fraction signal in response to the data read from the memory and the horizontal and vertical sync pulses supplied from the sync pulse separator circuit.

9. A video tape recording and reproducing apparatus with a screen-splitting capability, for use with a magnetic tape being packaged in cassette form, comprising:
 (a) transducer means for reading, writing and erasing a composite picture signal on the magnetic tape, the composite picture signal being comprised of picture information and horizontal and vertical sync pulses;
 (b) tape transport means for transporting the magnetic tape past the transducer means;
 (c) record/playback select means;
 (d) playback amplifier means capable of connection to the transducer means via the record/playback select means;
 (e) a playback circuit connected to the playback amplifier means for reconstructing the composite picture signal read from the magnetic tape;
 (f) a record circuit for inputting a composite picture signal to be recorded and for processing the same into form suitable for recording on the magnetic tape;
 (g) a sync pulse separator circuit connected to the playback circuit for deriving the horizontal and vertical sync pulses from the composite picture signal reconstructed;
 (h) window size input means for specifying a desired fraction of each frame of the composite picture signal recorded on the magnetic tape the fraction so specified defining a specified fraction;
 (i) a frame fraction signal generator circuit having first circuit means and second circuit means, the first circuit means being connected to both the sync pulse separator circuit and the window size input means and being responsive to the horizontal and vertical sync pulses derived from the composite picture signal for generating a pulse having a duration indicative of the specified fraction of each frame of the composite picture signal on the magnetic tape, the second circuit means being connected to both the first circuit means and the sync pulse separator circuit for modifying the output pulses of the first circuit means with the horizontal sync pulses of derived from the composite picture signal for providing, as the frame fraction signal, a series of pulses out of phase with the derived horizontal sync pulses, so that the horizontal sync pulses contained in the specified fraction of each frame of the composite picture signal on the magnetic tape are left unerased;
 (j) an erase oscillator for generating an erase signal at a predetermined frequency for erasing the composite picture signal on the magnetic tape;
 (k) record amplifier means capable of connection to the transducer means via the record/playback select means;
 (l) record/erase select means for selectively connecting the record circuit and the erase oscillator to the record amplifier means; and
 (m) a mode-setting circuit connected to the record/playback select means for causing the same to connect the transducer means to the playback amplifier means for operation in a playback mode, and to connect the transducer means to the record amplifier means for operation in a record mode, the mode-setting circuit being also connected to the record/erase select means for causing the same to connect the record circuit to the record amplifier means for operation in the record mode, the mode-setting circuit being also connected to the frame fraction signal generator circuit for causing the record/playback select means and the record/erase select means to connect the erase oscillator to the transducer means when, during operation in an erase mode, the frame fraction signal indicates the specified fraction of each frame of the composite picture signal to be erased.

10. The video tape recorder of claim 9 further comprising:
 (a) a black level oscillator for generating a black level signal having a frequency corresponding to the black level of the composite picture signal on the magnetic tape; and
 (b) a switch for selectively connecting the playback amplifier means and the black level oscillator to the playback circuit.

11. The video tape recorder of claim 10, wherein the switch is connected to both the mode-setting circuit and the frame fraction signal generator circuit thereby to be actuated for connecting the black level oscillator to the playback circuit during operation in the erase mode, the frame fraction signal indicating the specified fraction of each frame of the composite picture signal to be erased.

* * * * *